(12) United States Patent
Furuta

(10) Patent No.: US 11,031,194 B2
(45) Date of Patent: Jun. 8, 2021

(54) SWITCH AND IMAGING APPARATUS

(71) Applicant: CANON KABUSHIKI KAISHA, Tokyo (JP)

(72) Inventor: Takashi Furuta, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/722,918

(22) Filed: Dec. 20, 2019

(65) Prior Publication Data
US 2020/0243278 A1    Jul. 30, 2020

(30) Foreign Application Priority Data

Jan. 24, 2019    (JP) .............................. JP2019-010435

(51) Int. Cl.
| | | |
|---|---|---|
| *H01H 13/64* | (2006.01) | |
| *G03B 17/38* | (2021.01) | |
| *H01H 13/52* | (2006.01) | |
| *H01H 13/14* | (2006.01) | |

(52) U.S. Cl.
CPC ............. *H01H 13/64* (2013.01); *G03B 17/38* (2013.01); *H01H 13/14* (2013.01); *H01H 13/52* (2013.01); *H01H 2203/044* (2013.01); *H01H 2227/032* (2013.01); *H01H 2235/004* (2013.01)

(58) Field of Classification Search
CPC ........ H01H 13/64; H01H 13/14; H01H 13/52; H01H 2203/044; H01H 2227/032; H01H 2235/004; H01H 13/7006; H01H 2215/006; H01H 2215/008; H01H 2219/064; H01H 2219/044; H01H 2219/06; H01H 2219/062; H01H 2219/066; H01H 2219/0622; G03B 17/38

USPC ......................................................... 200/5 R
See application file for complete search history.

(56) References Cited

U.S. PATENT DOCUMENTS

| | | | | |
|---|---|---|---|---|
| 6,088,531 | A * | 7/2000 | Endoh .................... | H01H 13/06 396/29 |
| 6,621,018 | B1 * | 9/2003 | Chen .................... | H01H 15/005 200/16 C |
| 2012/0145525 | A1 * | 6/2012 | Ishikawa .............. | H01H 13/785 200/512 |

FOREIGN PATENT DOCUMENTS

| | | |
|---|---|---|
| JP | 2001-305643 A | 11/2001 |
| JP | 2012-128998 A | 7/2012 |

* cited by examiner

*Primary Examiner* — Edwin A. Leon
(74) *Attorney, Agent, or Firm* — Venable LLP

(57) ABSTRACT

A switch includes a first elastic member that is conductive and configured to contact the first signal pattern, a second elastic member that is conductive and configured to contact the second signal pattern, and a third elastic member that is conductive and configured to contact the third signal pattern. When a first pressing operation is performed for the press member so as to move the press member from an initial position in the pressing direction the first and second signal patterns are electrically connectable via the first and second elastic members. After the first pressing operation, when a second pressing operation is performed for the press member so as to move the press member in a direction opposite to the pressing direction by the first and second elastic members, the first to third signal patterns are electrically connectable via the first to third elastic members.

22 Claims, 17 Drawing Sheets

SWITCH AND IMAGING APPARATUS

BACKGROUND OF THE INVENTION

Field of the Invention

The present invention relates to a pressing operation type switch and imaging apparatus.

Description of the Related Art

A conventional imaging apparatus is configured to perform a photometric operation and a focus detection operation after detecting a first-stage pressing operation of a release button, and to release a shutter after detecting a second-stage pressing operation of the release button. With the release switch that does not move further after the shutter is released, the force for pressing the release button in releasing the shutter is transmitted to the imaging apparatus, vibrates the entire imaging apparatus, etc., and prevents a smooth shutter operation. In addition, it is better for the photographer to perform the pressing operation without a click sense after the second-stage pressing operation is detected.

Japanese Patent Laid-Open No. ("JP") 2001-305643 discloses a release switch in which three leaf spring shaped electric armatures made of mutually insulated conductors overlap one another in the pressing direction of the release button. The release switch disclosed in JP 2001-305643 detects the first-stage pressing operation by a contact between the first armature and the second armature, and the second-stage pressing operation by a contact between the second armature and the third armature, and allows the release button to be pressed further even after the second-stage pressing operation.

JP 2012-128998 discloses a release switch device for detecting the first-stage and second-stage pressing operations by bending a flexible substrate and bringing it into contact with an opposite signal pattern portion in order to reduce a projection area in the pressing direction of the release button.

The release switch disclosed in JP 2001-305643 needs a sufficient plate thickness and length for the electric armature to obtain a predetermined biasing force and elasticity, which hinders the compact configuration of the release switch.

The release switch device disclosed in JP 2012-128998 requires a space in a height direction for the opposite signal pattern portion and a space for the swelling flexible substrate in pressing the release button, which hinders the compact configuration of the release switch.

Since the configurations disclosed in JPs 2001-305643 and 2012-128998 are complex, the assemblies are also complex, which hinders the workload reduction.

SUMMARY OF THE INVENTION

The present invention provides an easy-to-operate, compact, and easy-to-assemble switch and an imaging apparatus having the same.

A switch according to one aspect of the present invention includes a press member movable in a pressing direction when pressed, a substrate having a first signal pattern, a second signal pattern, and a third signal pattern, a first elastic member that is conductive, disposed between the press member and the substrate, and configured to contact the first signal pattern, a second elastic member that is conductive, disposed between the press member and the substrate, and configured to contact the second signal pattern, and a third elastic member that is conductive, disposed between the press member and the substrate, and configured to contact the third signal pattern. The second elastic member elastically deformable in the pressing direction. When a first pressing operation is performed for the press member so as to move the press member from an initial position in the pressing direction the first and second signal patterns are electrically connectable via the first and second elastic members. After the first pressing operation, when a second pressing operation is performed for the press member so as to move the press member in a direction opposite to the pressing direction by the first and second elastic members, the first to third signal patterns are electrically connectable via the first to third elastic members. An imaging apparatus having this switch also constitutes another aspect of the present invention.

Further features of the present invention will become apparent from the following description of exemplary embodiments with reference to the attached drawings.

DESCRIPTION OF THE EMBODIMENTS

Figure 1:
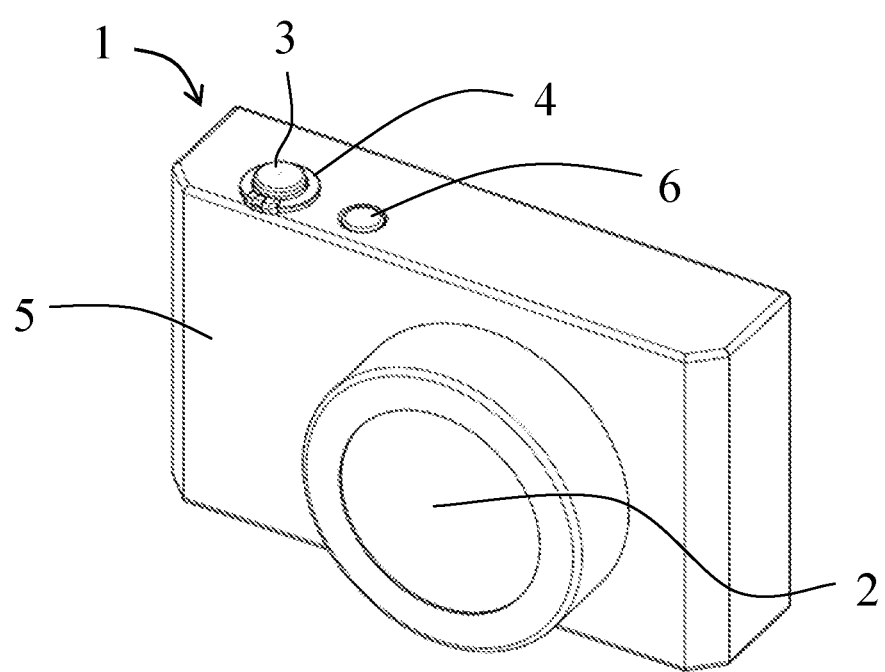
FIG. 1 is an overview of an imaging apparatus according to one embodiment of the present invention.

Referring now to the accompanying drawings, a detailed description will be given of embodiments according to the present invention. Corresponding elements in respective figures will be designated by the same reference numerals, and a description thereof will be omitted.

First Embodiment

FIG. 1 is an overview of an imaging apparatus 1 according to one embodiment of the present invention. A lens unit 2 includes an imaging optical system and forms an image of light from the object on the image sensor. Located on the top surface of the imaging apparatus 1 are a release button (press member) 3 to be pressed in imaging, a zoom lever 4 rotatable around the release button 3 and to be operated in changing the focal length, a power button 6 to be operated in turning on and off the power. An exterior cover 5 is a cover that protects an internal structure such as an image sensor and a control substrate.

Figure 2A:
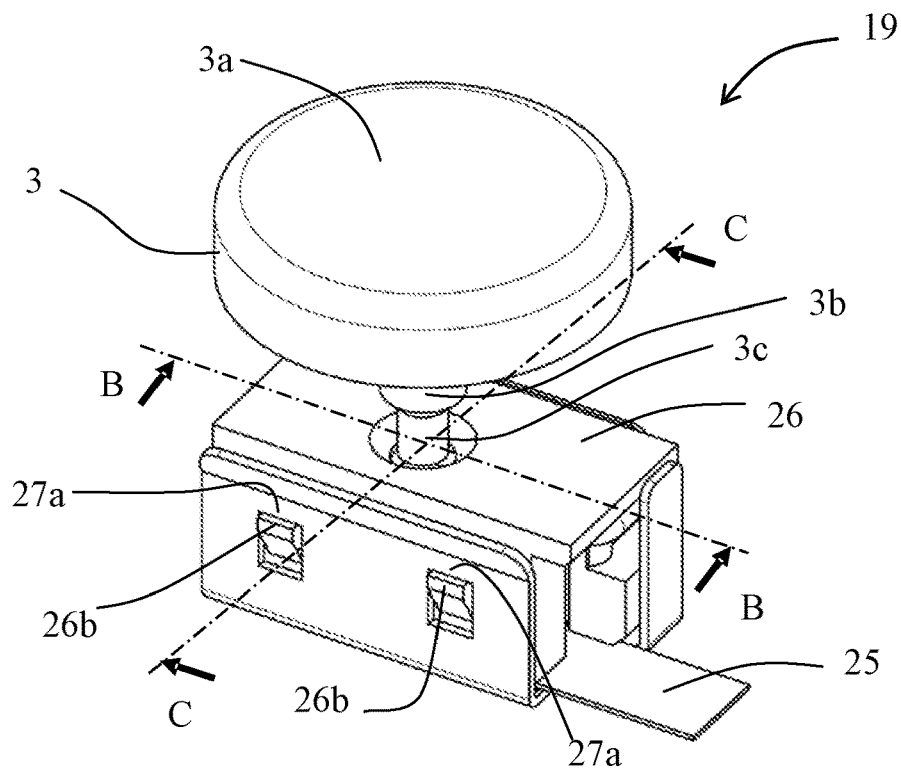
FIGS. 2A and 2B explain a release switch according to a first embodiment.
Figure 2B:
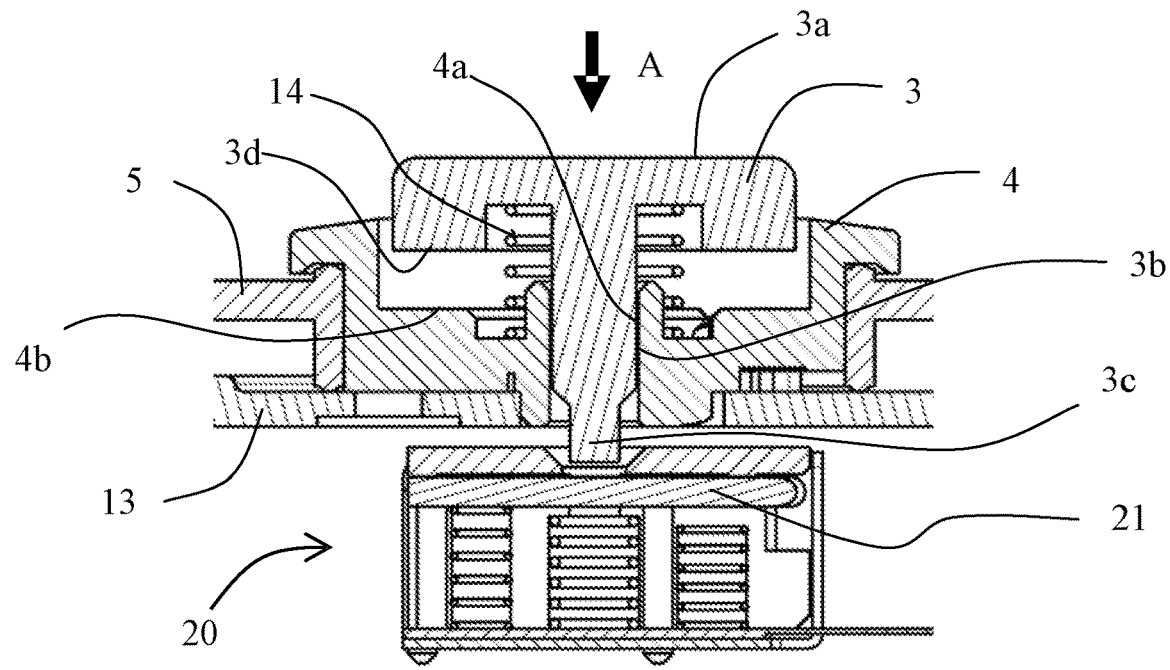

Referring now to FIGS. 2A and 2B, a description will be given of a structure of a release switch 19 according to this embodiment. FIGS. 2A and 2B explain the release switch 19. FIG. 2A is a perspective view of a release switch 19, and FIG. 2B is a sectional view taken along a line B-B in FIG. 2A including the release switch 19 and a housing at the center of the release button 3.

The release switch 19 includes the release button 3 and a release switch module 20. The release button 3 includes a flat surface portion 3a, a shaft portion 3b, a pressing portion 3c, and a stopper portion 3d, and moves to an arrow A direction or a pressing direction in FIG. 2B when pressed. The flat surface portion 3a is a portion to be pressed by the photographer. The shaft portion 3b is inserted into a bearing portion 4a in the zoom lever 4 and thereby assembled, and configured to guide a linear movement of the release button 3 in the pressing direction. The stopper portion 3d contacts a receiving portion 4b of the zoom lever 4 when the release button 3 is moved to the maximum. A coil spring 14 is attached around the bearing portion 4a and forces the release button 3 in a direction opposite to the pressing direction. The release button 3 is engaged with the zoom lever 4 by a hook portion (not shown) to prevent the coil spring 14 from coming off against the repulsive force.

The zoom holder 13 is fixed integrally with the zoom lever 4 through heat caulking. The zoom lever 4 and the zoom holder 13 are attached so as to sandwich the outer cover 5 to restrict their positions in the pressing direction, and rotatably around the shaft portion 3b as a rotation center. A contact brush (not shown) is attached to the zoom holder 13. The contact brush contacts a signal pattern on a substrate (not shown), and the lens unit 2 is driven for zooming according to the rotation position of the zoom lever 4.

Figure 3A:
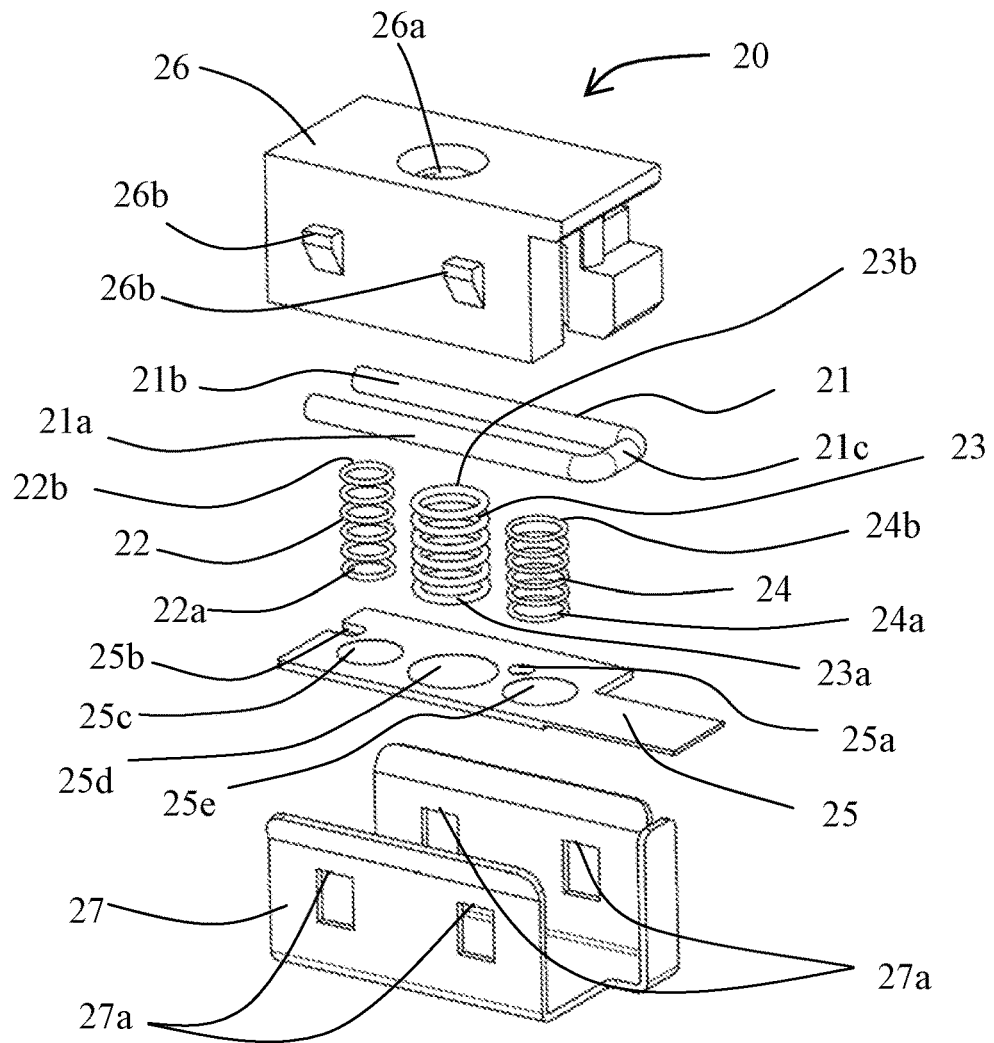
FIGS. 3A and 3B explain a release switch module.
Figure 3B:
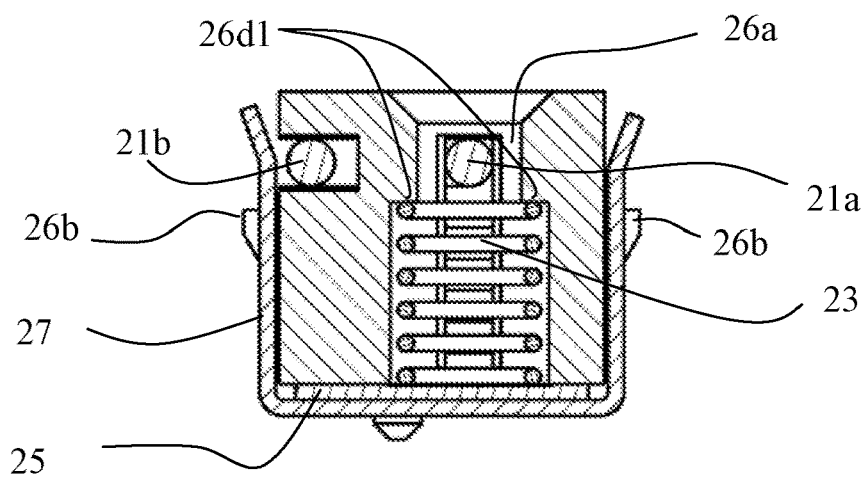

Referring now to FIGS. 3A and 3B, a description will be given of a component configuration of the release switch module 20. FIGS. 3A and 3B explain the release switch module 20. FIG. 3A is an exploded perspective view, and FIG. 3B is a sectional view taken along a line C-C in FIG. 2A, and illustrates an initial state in which the release button 3 is not pressed or the release button 3 is located at the initial position.

The release switch module 20 has a configuration for detecting a two-stage pressing operation of the release button 3. Conductive coil springs 22, 23, and 24 are conductive and can be expanded and contracted (or are elastically deformable) in the pressing direction. In this embodiment, the conductive coil spring 23 has a biasing force in a direction opposite to the pressing direction larger than that of each of the conductive coil springs 22 and 24. A flexible substrate 25 is a substrate that transmits an electrical signal to the control substrate. The flexible substrate 25 has a positioning hole 25a and a positioning notch 25b used for positioning. The flexible substrate 25 has a plurality of signal patterns 25c, 25d, and 25e facing respective end portions 22a, 23a, and 24a of the conductive coil springs 22, 23, and 24. In the assembled state (initial state) incorporated in the release switch 19, the conductive coil springs 22, 23, and 24 and the signal patterns 25c, 25d, and 25e contact and are electrically connected to each other.

A conductive member 21 is formed in a U shape by bending metal wire, and includes a contact portion (contact portion) 21a that contacts the conductive coil springs 22, 23, and 24 for electrical conductivities, a movement restricting portion 21b formed parallel to the portion 21a, and an intermediate portion 21c. The conductive member 21 moves when the release button 3 is pressed, and contacts the conductive coil springs 22, 23, and 24 according to the moving amount.

A base member (holder) 26 movably holds the conductive member 21, and holds the conductive coil springs 22, 23, and 24 so that they can be expanded and contracted along the pressing direction. The base member 26 has an opening portion 26a through which the pressing portion 3c is inserted, and tab portions 26b disposed on both side surfaces. The pressing portion 3c contacts the conductive member 21 after passing through the opening 26a.

A fixing member 27 is formed by bending a sheet metal and includes engaging portions 27a on both side surfaces. As illustrated in FIGS. 2A and 3B, the conductive member 21, the conductive coil springs 22, 23, and 24 and the flexible substrate 25 are held when the engaging portion 27a is engaged with the tab portion 26b.

The assembly of the release switch 19 requires no conventional workload such as bending a flexible substrate, and each component can be attached from one direction. Therefore, the release switch 19 can be easily assembled, and can be easily adapted to assembly by automation.

Figure 4A:
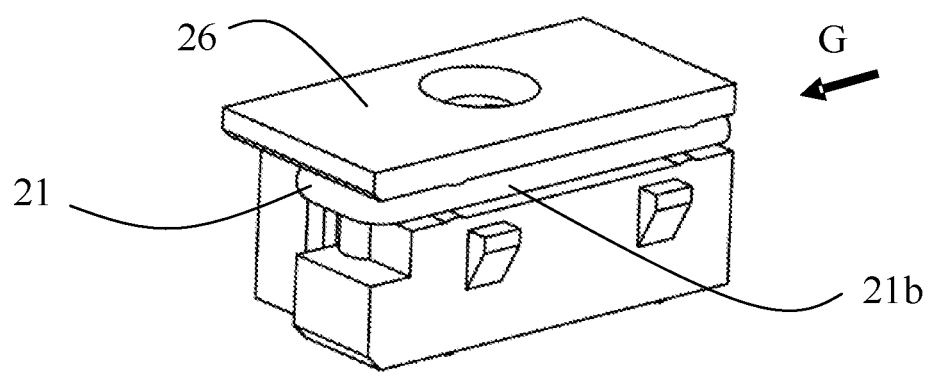
FIGS. 4A to 4C illustrate a base member and a conductive member in an assembled state.
Figure 4B:
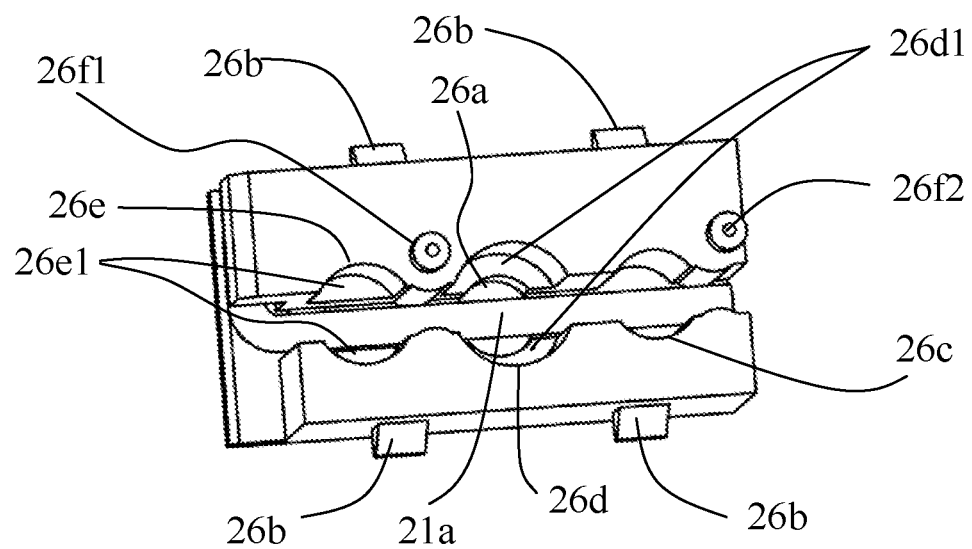
Figure 4C:
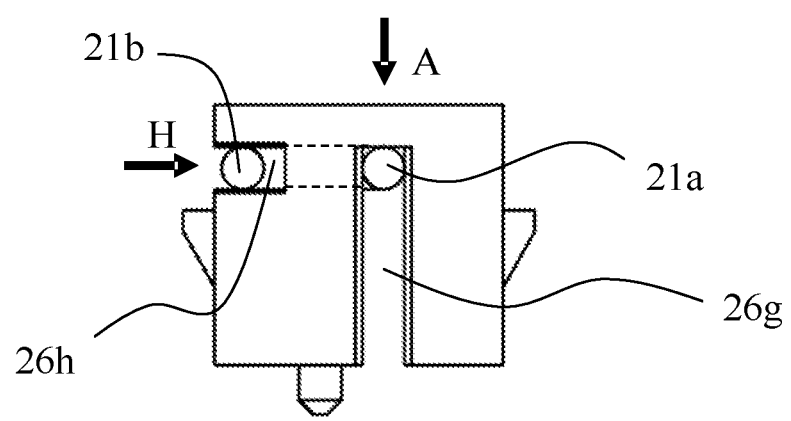

FIGS. 4A to 4C illustrate the base member 26 and the conductive member 21 in an assembled state. FIGS. 4A to 4C respectively illustrate a top perspective view, a bottom perspective view, and a side view viewed from an arrow G direction in FIG. 4A.

As illustrated in FIG. 4B, the base member 26 includes housing portions 26c, 26d, and 26e configured to house the conductive coil springs 22, 23, and 24, respectively. When the conductive coil spring 23 is assembled as illustrated in FIG. 3B, a tip 23b abuts against a contact surface (first contact portion) 26d1 provided to the base member 26, is compressed to a predetermined length, and held with a predetermined first clearance from the conductive member 21. As illustrated in FIG. 4C, a passage groove 26g guides the contact portion 21a so as to move it in a direction parallel to the pressing direction of the release button 3. A movement restricting groove 26h guides the movement restricting portion 21b to move it in a direction perpendicular to the pressing direction. In other words, when the contact portion 21a is pressed in the pressing direction (arrow A direction), the movement restricting portion 21b moves in an arrow H direction and the conductive member 21 is guided and moved by the base member 26 while being tilted.

The contact surface 26d1 is formed in a range excluding the passage groove 26g and the opening 26a. In order to receive the force of the conductive coil spring 23 in a well-balanced manner, this embodiment disposes the conductive coil spring 23 so that it contacts the conductive member 21 at the coil center, and forms the contact surfaces 26d1 on both sides of the conductive member 21 across the passage groove 26g. Thus, in order to reduce the coil diameter of the conductive coil spring 23 and thereby to reduce the size of the release module 20, it is effective to make the conductive member 21 thinner by using a wire.

When the conductive coil spring 24 is assembled in the same manner as the conductive coil spring 23, a tip 24b contacts a contact surface (second contact portion) 26e1 provided on the base member 26, is compressed to a predetermined length, and is held with a predetermined second clearance from the conductive member 21. The second clearance is longer than the first clearance that is a clearance between the conductive member 21 and the conductive coil spring 23.

Positioning convex portions 26f1 and 26f2 are inserted into the positioning hole 25a and the positioning notch 25b, respectively. The flexible substrate 25 and the base member 26 are positioned by these members, and the positional accuracy is maintained between the conductive coil springs 22, 23, and 24 and the flexible substrate 25.

Figure 5A:
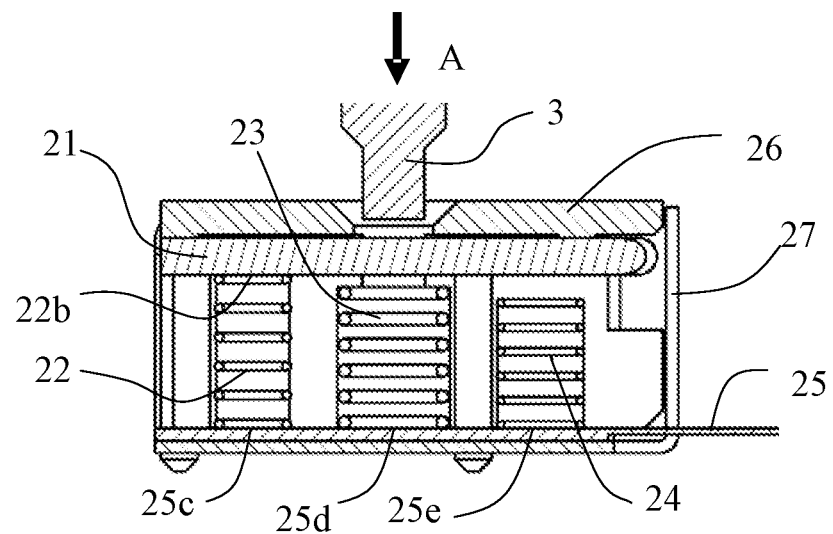
FIGS. 5A to 5D are sectional views of the release switch.
Figure 5B:
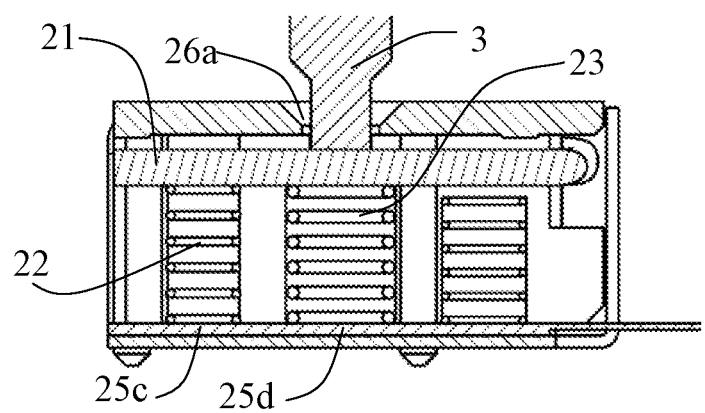
Figure 5C:
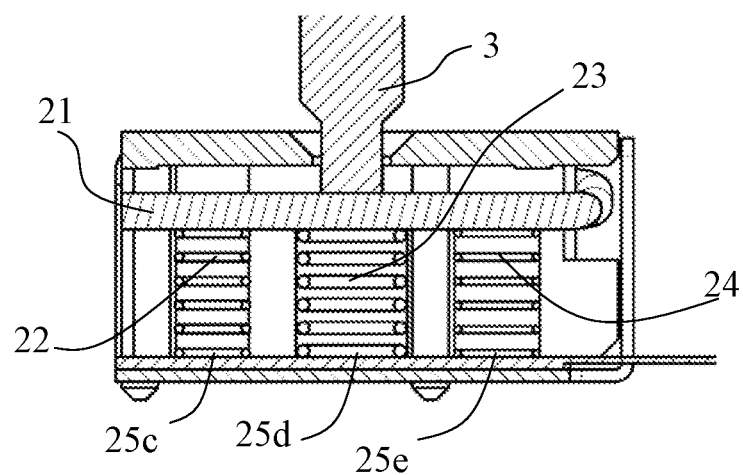
Figure 5D:
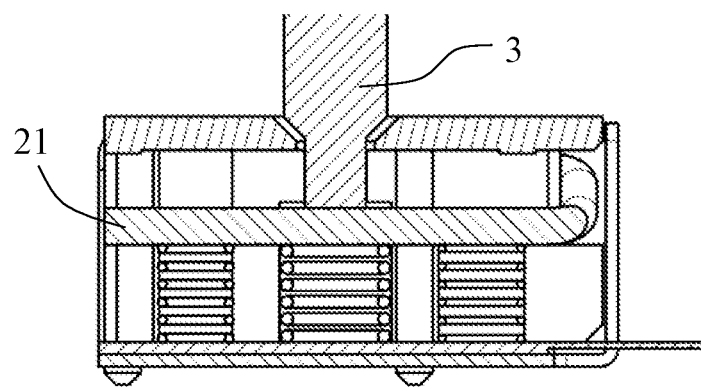
Figure 6:
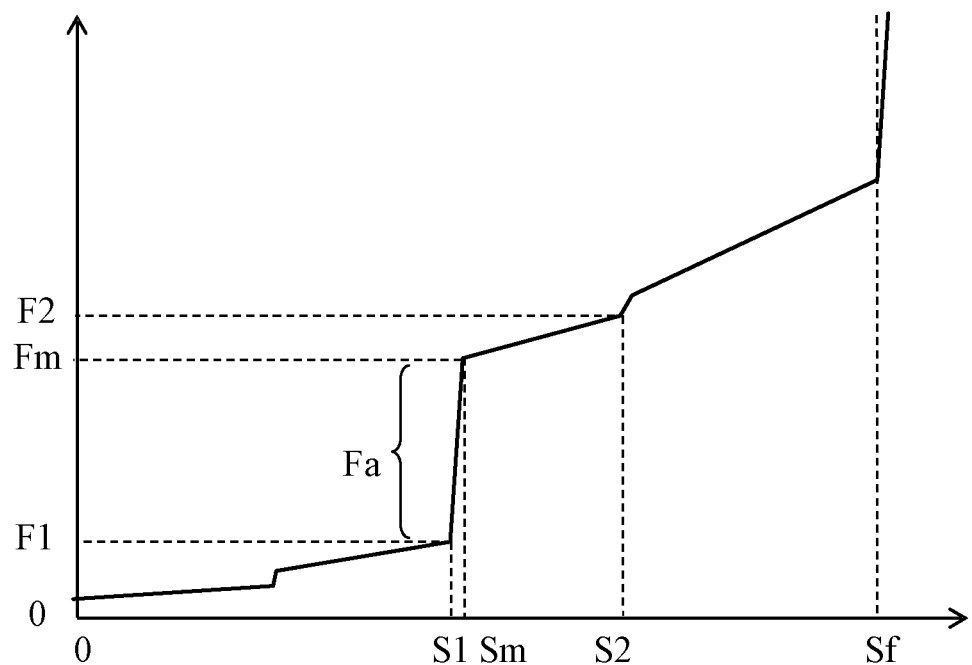
FIG. 6 illustrates a relationship between a moving amount of a release button and a load.

Referring to FIGS. 5A to 6, a description will be given of a detection method of a two-stage pressing operation. FIGS. 5A to 5D are sectional view of the release switch 19 taken along line B-B in FIG. 2A. FIGS. 5A to 5D respectively illustrate the initial state, a state when the first-stage pressing operation is detected, a state when the second-step pressing operation is detected, and a state when the release button 3 is moved to the maximum. FIG. 6 illustrates a relationship between the moving amount of the release button 3 and the load when the release button 3 is pressed. An abscissa axis represents the moving amount of the release button 3, and an ordinate axis represents the load required to press the release button 3.

As illustrated in FIG. 5A, in the initial state, the conductive coil spring 22 is held in a compressed state with the tip 22b abutting against the conductive member 21. At this time, the conductive coil spring 22 forces the conductive member 21 in the direction opposite to the pressing direction. The conductive member 21 and the signal pattern 25c are electrically connected to each other via the conductive coil spring 22. As described above, the conductive coil springs 23 and 24 are compressed to predetermined lengths and are held with predetermined clearances from the conductive member 21.

When the release button 3 is pressed from the initial state, the pressing portion 3c comes into contact with the conductive member 21, as illustrated in FIG. 5B. When a load larger than the biasing force of the conductive coil spring 22 is applied to the conductive coil spring 22, the conductive coil spring 22 starts being compressed. When the release button 3 is further pressed, the conductive member 21 comes into contact with the conductive coil spring 23. That is, the signal patterns 25c and 25d are in a first state in which the signal patterns 25c and 25d are electrically connectable via the conductive coil springs 22 and 23 and the conductive member 21. The pressing operation of the release button 3 from the initial state to the first state will be referred to as a first-stage pressing operation. A first detector (not shown) provided to the imaging apparatus 1 detects the first-stage pressing operation by detecting that the signal patterns 25c and 25d have been electrically connected. When the first pressing operation is detected by the first detector, a photometric operation and a focus detection operation are started.

As illustrated in FIG. 6, where Si is a moving amount of the release button 3 from the initial state to the state in which the first-stage pressing operation is detected, the load necessary for pressing becomes F1. Where Fa is a biasing force of the conductive coil spring 23, in order to further compress the conductive coil spring 23 from this state, it is necessary to apply a pressing force larger than the biasing force Fa. Where Sm is a moving amount when the conductive coil spring 23 starts being further compressed and Fm is a load at that time, the weight Fm is expressed by the following relational expression (1).

$$Fm = F1 + Fa \quad (1)$$

When the release button 3 is further pressed from the state of the moving amount Sm, the conductive member 21 comes into contact with the conductive coil spring 24, as illustrated in FIG. 5C. That is, the signal patterns 25c, 25d, and 25e become in a second state in which the signal patterns 25c, 25d, and 25e are electrically connectable via the conductive coil springs 22, 23, and 24 and the conductive member 21. The pressing operation of the release button 3 from the first state to the second state will be referred to as a second-stage pressing operation (second pressing operation). A second detector (not shown) provided to the imaging apparatus detects the second-stage pressing operation by detecting that the signal patterns 25c, 25d, and 25e have been electrically connected. When the second-stage pressing operation is detected by the second detector, the shutter driving device is activated, the shutter is opened and closed, and the image sensor is exposed. Due to the biasing force Fa of the conductive coil spring 23, the photographer can easily stop the release button 3 in a state where the first-stage pressing operation is detected, and can easily perform a photometric operation and a focus detection operation. As illustrated in FIG. 6, where S2 is a moving amount of the release button 3 when the second-stage pressing operation is detected, the load necessary for pressing to this state is F2.

When the load larger than the biasing force generated in the conductive coil spring 24 in the initial state is applied to the conductive coil spring 24 from the state of FIG. 5C, the conductive coil spring 24 starts being compressed. As the biasing force becomes smaller, the feel can be better than that with the larger biasing force without applying an unnecessary load after the second-stage pressing operation is detected.

The release switch 19 is configured such that the release button 3 can be further pressed after the second-stage pressing operation is performed. Therefore, when the shutter is released, a favorable shutter operation can be performed without generating a vibration caused by transmitting a force for pressing the release button 3 to the imaging apparatus 1. When the release button 3 is further pressed from the state in which the second-stage pressing operation has been performed, the conductive coil springs 22, 23, and 24 are further compressed, the stopper portion 3d comes into contact with the receiving portion 4b, and the release button 3 stops moving at the position of FIG. 5D. As illustrated in FIG. 6, Sf is a moving amount in this state.

As described above, this embodiment disposes the conductive coil springs 22, 23, and 24 parallel to the pressing direction of the release button 3 and acquires a desired load, and locates the conductive coil springs 22, 23, and 24 on the signal path of the detector. Thus, the release switch 19 can be made smaller relative to the projected area in the pressing direction.

In particular, in using a conventional electric armature to obtain a large biasing force necessary after the first stage pressing operation is performed and to prevent a plastic deformation in the repetitive switching operation, the electric armature requires a sufficient thickness and length, which increases the size of the release switch. It is thus effective for the miniaturization to obtain the biasing force by disposing the conductive coil spring 23 parallel to the pressing direction.

Strictly speaking, the ideal pressing load of the release button 3 varies depending on each user. Thus, when the customization of the relationship between the moving amount of the release button 3 and the load is considered, use of the coil spring as in this embodiment facilitates the manufacturing support of components having different biasing forces and spring constants, rather than use of the conventional electric armature.

While this embodiment forms the conductive member 21 in the U shape, the present invention is not limited to this embodiment. For example, the conductive member 21 may include only the contact portion 21a and the intermediate portion 21c and may be formed in an L shape. In this case, the conductive member 21 is held by the base member 26 rotatably around the intermediate portion 21c as a rotation axis, and comes into contact with the conductive coil springs 22, 23, and 24 due to the rotation operation. Thereby, the conductive member 21 and thus the release switch module 20 can be made smaller.

This embodiment uses three conductive coil springs 22, 23, and 24, but may use another conductive elastic member such as conductive rubber. However, this modification relates to the good or bad feel of the release switch, and thus the conductive coil spring 23 in order to obtain a large biasing force and load accuracy after the first-stage pressing operation is performed. Since the conductive coil springs 22 and 24 are mainly intended for the electrical connections, another conductive elastic member can be used, such as conductive rubber.

Second Embodiment

Figure 7A:
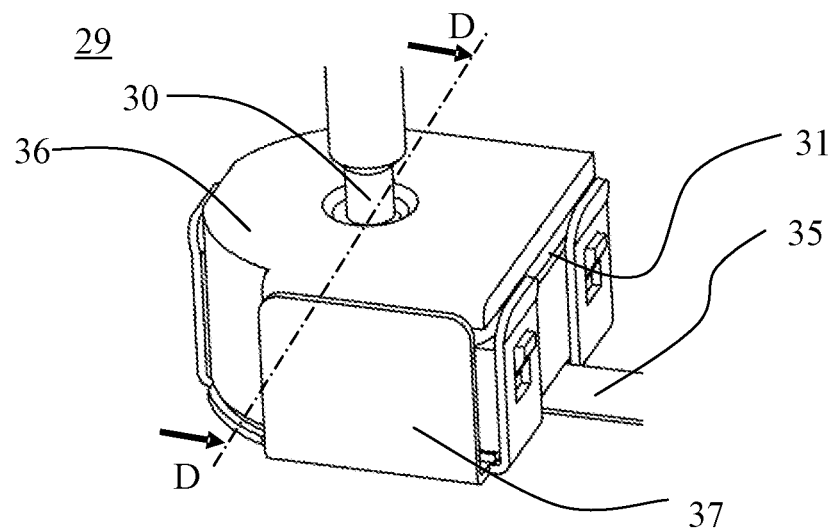
FIGS. 7A to 7C explain a release switch according to a second embodiment.
Figure 7B:
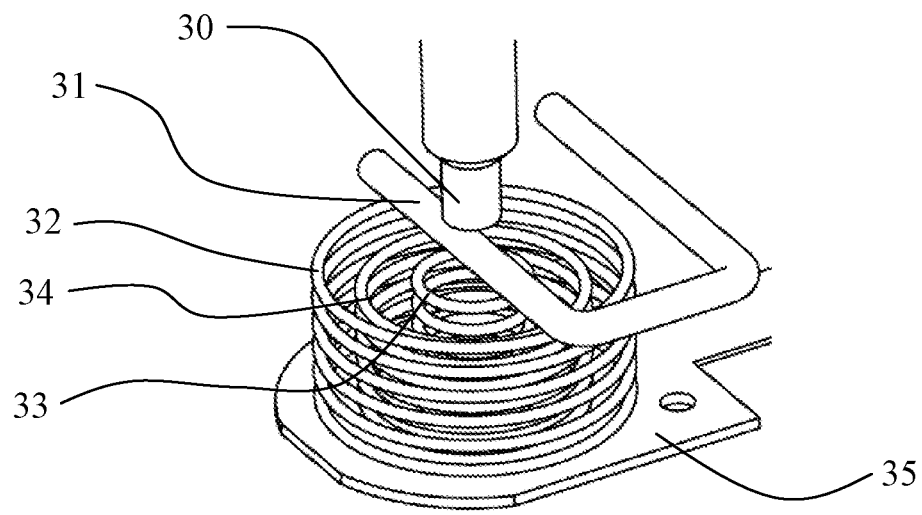
Figure 7C:
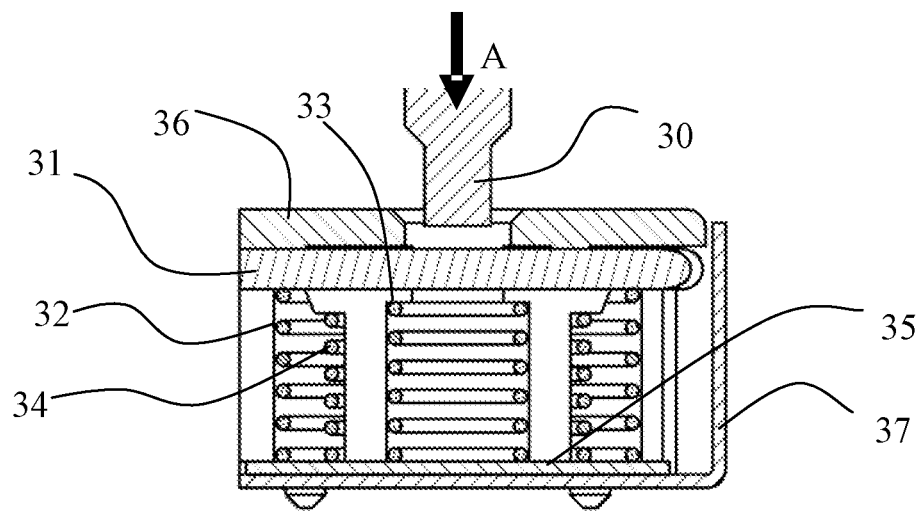

Referring now to FIGS. 7A to 7C, a description will be given of a structure of a release switch 29 according to this embodiment. FIG. 7A to 7C explain the release switch 29 according to this embodiment. FIG. 7A is a perspective view of the release switch 29. FIG. 7B illustrates the release switch 29 except for a base member 36 and a fixing member 37. FIG. 7C is a sectional view taken along a line D-D in FIG. 7A.

The conductive member 31 is formed in a U shape by bending a metal wire. Conductive coil springs 32, 33, and 34 are disposed concentrically when viewed from the pressing direction so that the respective centers substantially coincide with the axial center (pressing center) of the pressing portion 30 in the release button. A flexible substrate 35 has signal patterns 35a, 35b, and 35c (not shown) that contact ends of the conductive coil springs 32, 33, and 34, respectively. In the assembled state, the flexible substrate 35 is electrically connected to each conductive coil spring. In the initial state, the conductive coil spring 32 forces the conductive member 31 and keeps the conductive member 31 stationary. At the same time, the conductive member 31 is electrically connected to the signal pattern 35a via the conductive coil spring 32.

The base member 36 positions the conductive coil springs 32, 33, and 34 and the flexible substrate 35. The fixing member 37 is made of a sheet metal, engaged with the base member 36, and configured to hold the conductive member 31, the conductive coil springs 32, 33, and 34, and the flexible substrate 35. In the initial state, the conductive coil springs 33 and 34 are separated from the conductive member 31.

Referring to FIG. 7C, a description will be given of a method for detecting the two-stage pressing operation. The pressing portion 30 moves in the pressing direction (arrow A direction) from the initial state, and contacts the conductive member 31. When the pressing portion 30 is further pressed, the conductive member 31 comes into contact with the conductive coil spring 33 and becomes conductive. When the signal patterns 35a and 35b are electrically connected via the conductive member 31 and the conductive coil springs 32 and 33, the first-stage pressing operation is detected.

When the pressing portion 30 is further pressed, the conductive member 31 comes into contact with the conductive coil spring 34. The signal pattern 35a, 35b, 35c is electrically connected via the conductive member 31 and the conductive coil springs 32, 33, 34, so that the second-stage pressing operation is detected.

Since the biasing force of the conductive coil spring 33 is larger than that of each of the conductive coil springs 32 and 34, this embodiment can realize a relationship similar to that between the moving amount of the release button 3 and the load illustrated in FIG. 6.

As described above, the space can be saved by arranging the conductive coil springs 32, 33, and 34 concentrically when viewed from the pressing direction. Since the center of the repulsive force of the conductive coil springs 32, 33, and 34 is always substantially coincident with the axial center of the pressing portion 30 from the initial state to a state at the time of the maximum moving amount of the pressing portion 30, a smooth pressing operation of the pressing portion 30 can be realized.

Third Embodiment

Figure 8A:
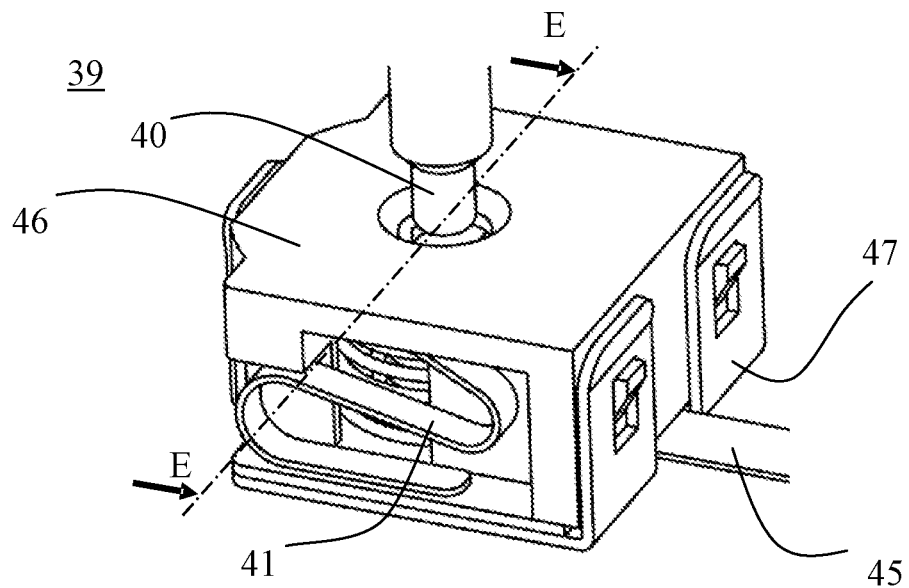
FIG. 8A to 8C explain a release switch according to a third embodiment.
Figure 8B:
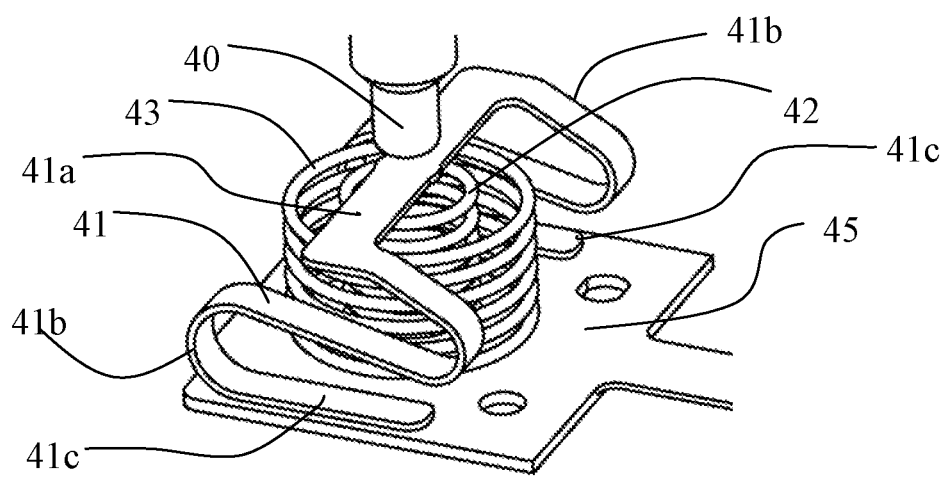
Figure 8C:
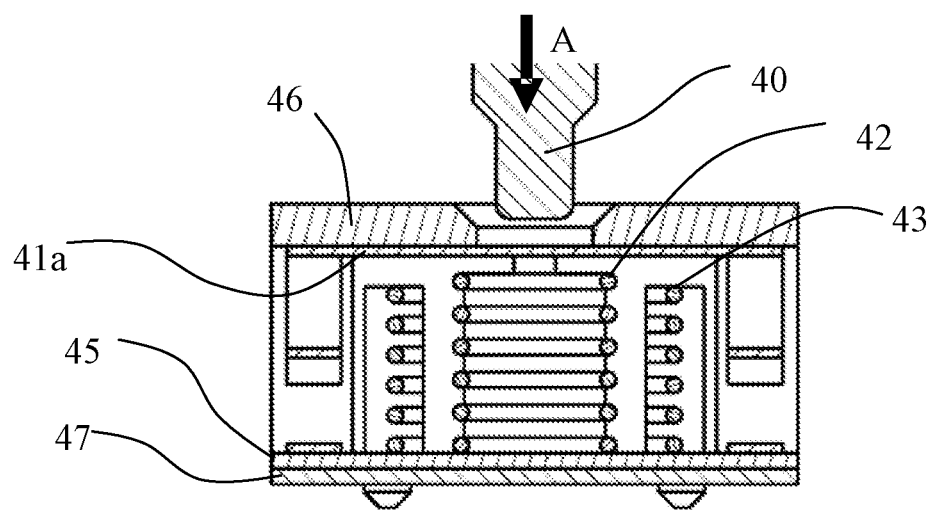

Referring now to FIGS. 8A to 8C, a description will be given of a structure of the release switch according to this embodiment. FIGS. 8A to 8C explain the release switch 39 according to this embodiment. FIG. 8A is a perspective view of the release switch 39. FIG. 8B illustrates the release switch 39 except for a base member 46 and a fixing member 47. FIG. 8C is a sectional view taken along a line E-E in FIG. 8A.

A conductive elastic plate member 41 is formed by bending a sheet metal. Conductive coil springs 42 and 43 are arranged concentrically when viewed from the pressing direction so that the respective centers substantially coincide with the axial center (pressing center) of a pressing portion 40 of the release button. The conductive elastic plate member 41 includes a contact portion 41a, elastic portions 41b, and a ground portion (connector) 41c. The contact portion 41a can contact the conductive coil springs 42 and 43. The elastic portions 41b are disposed on both sides of the contact portion 41a and elastically deformable in the pressing direction. A flexible substrate 45 includes a signal pattern connected to the control substrate. In the assembled state, ends of the conductive coil springs 42 and 43 contact and are electrically connected to signal patterns 45a and 45b (not shown) of the flexible substrate 45, respectively. The ground portion 41c of the conductive elastic plate member 41 contacts and is electrically connected to a signal pattern 45c (not shown) of the flexible substrate 45.

The base member 46 positions the conductive coil springs 42 and 43 and the flexible substrate 45. The fixing member 47 is made of a sheet metal, engaged with the base member 46, and configured to hold the conductive elastic plate member 41, the conductive coil springs 42 and 43, and the flexible substrate 45.

Referring to FIG. 8C, a description will be given of a detection method of the two-stage pressing operation. The pressing portion 40 moves in the pressing direction (arrow A direction) from the initial state, and contacts the conductive elastic plate member 41. When the pressing portion 40 is further pressed, a conductive elastic plate member 41 comes into contact with the conductive coil spring 42 and becomes conductive. When the signal patterns 45a and 45c are electrically connected via the conductive elastic plate member 41 and the conductive coil spring 42, the first-stage pressing operation is detected.

When the pressing portion 40 is further pressed, the conductive elastic plate member 41 comes into contact with the conductive coil spring 43. When the signal patterns 45a, 45b, and 45c are electrically connected via the conductive elastic plate member 41 and the conductive coil springs 42 and 43, the second-stage pressing operation is detected.

Since the biasing force of the conductive coil spring 42 is larger than that of each of the conductive elastic plate member 41 and the conductive coil spring 43, this embodiment can realize a relationship similar to that between the moving amount and load of the release button 3 illustrated in FIG. 6.

As described above, the release switch according to this embodiment can be made thinner than the configuration of the second embodiment by replacing the rod-shaped conductive member with the conductive elastic plate member 41. Since the conductive elastic plate member 41 includes the elastic portion 41b, one conductive coil spring can be deleted. Thus, the assembly workload can be saved and the miniaturization can be promoted.

Fourth Embodiment

Figure 9A:
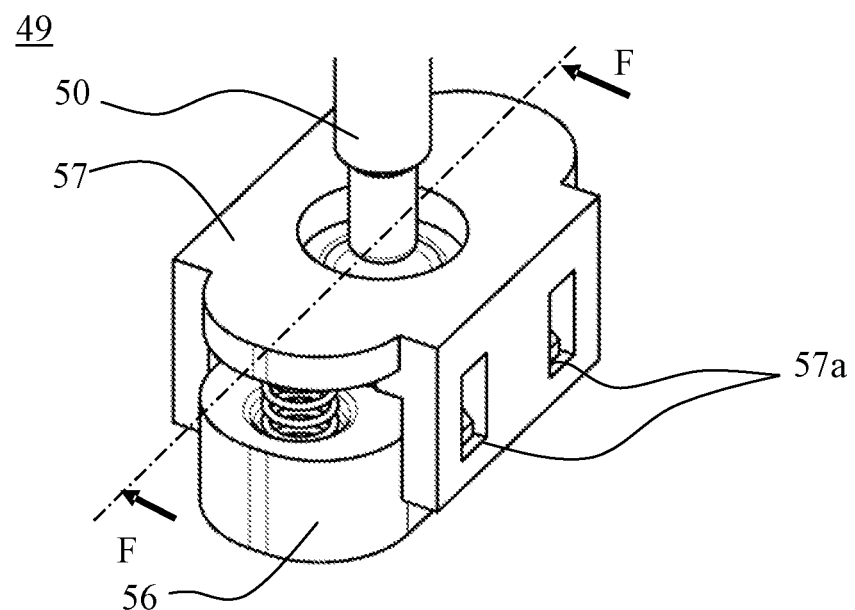
FIG. 9A to 9C explain a release switch according to a fourth embodiment.
Figure 9B:
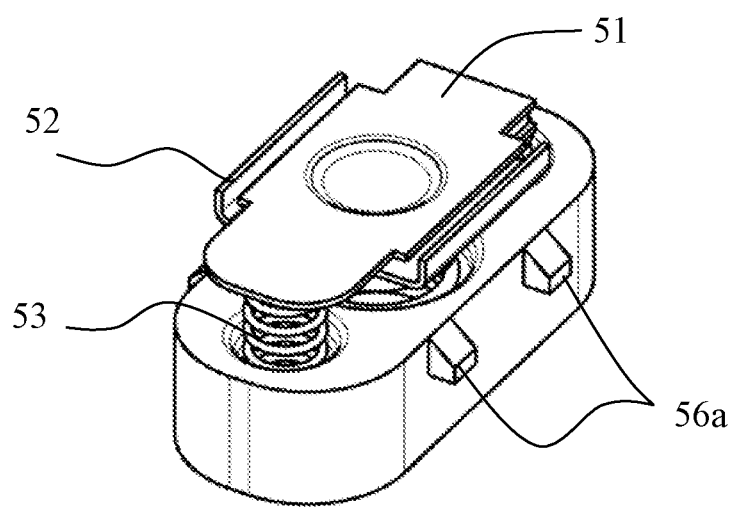
Figure 9C:
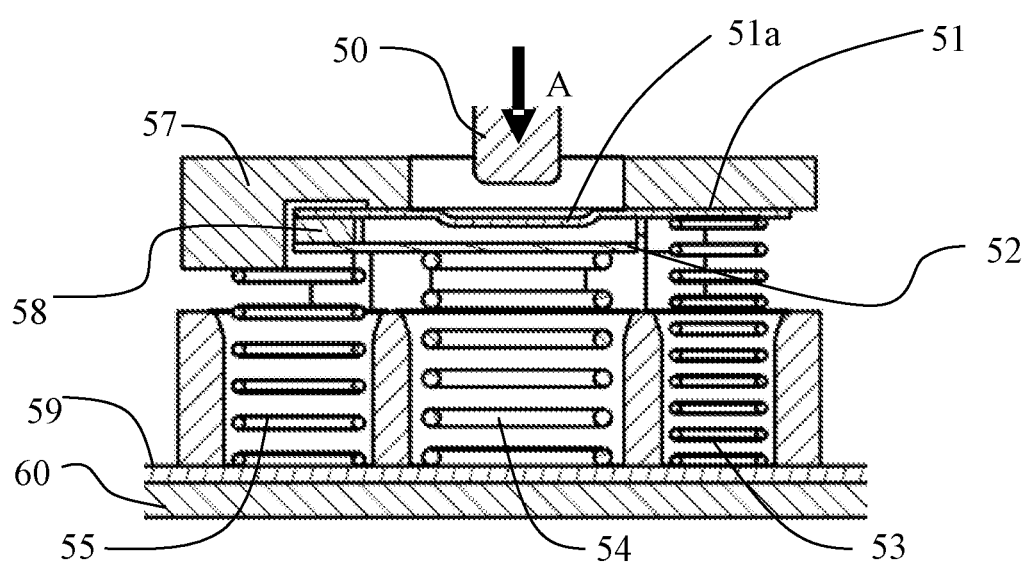

Referring now to FIGS. 9A to 9C, a description will be given of a structure of a release switch 49 according to this embodiment. FIG. 9A to 9C explain the release switch 49 according to this embodiment. FIG. 9A is a perspective view of the release switch 49. FIG. 9B illustrates the release switch 49 except for the holder member 57. FIG. 9C is a sectional view taken along line F-F in FIG. 9A.

Each of an upper conductive member 51 and a lower conductive member 52 is formed by bending a sheet metal. An insulative member 58 is disposed between the upper conductive member 51 and the lower conductive member 52 and bonded to the lower conductive member 52. In the assembled state, end portions of conductive coil springs 53, 54, and 55 contact and are electrically connected to signal patterns 59a, 59b, and 59c (not shown) of a flexible substrate 59, respectively. The conductive coil springs 53, 54, and 55 are inserted into a housing of a base member 56 and positioned. A holder member 57 is held by the base member 56 movably in the pressing direction (arrow A direction). A base sheet metal member 60 serves as a receiving portion of the flexible substrate 59, and fixes the base member 56 by heat caulking (not shown) or the like.

In the assembled state, the conductive coil spring 53 forces the holder member 57 to the side opposite to the pressing direction via the upper conductive member 51. The conductive coil spring 54 forces the holder member 57 to the opposite side to the pressing direction via the lower conductive member 52. The conductive coil spring 55 directly forces the holder member 57 to the side opposite to the pressing direction. The holder member 57 remains stationary when a lock portion 57a of the holder member 57 contacts a lock portion 56a of the base member 56.

In the assembled state, the conductive coil spring 53 contacts and is electrically connected to the upper conductive member 51. The conductive coil spring 54 contacts and is electrically connected to the lower conductive member 52.

Referring to FIG. 9C, a description will be given of a detection method of the two-stage pressing operation. The release button pressing portion 50 moves from the initial state in the pressing direction (arrow A direction) and contacts the upper conductive member 51. When the pressing portion 50 is further pressed, the conductive coil spring 53 having a weak biasing force shrinks, the upper conductive member 51 tilts, and a convex portion 51a of the upper conductive member 51 contacts the lower conductive member 52. At this time, the signal patterns 59a and 59b are electrically connected via the upper conductive member 51, the lower conductive member 52, and the conductive coil springs 53 and 54, so that the first-stage pressing operation is detected.

When a force equal to or greater than the biasing force of the conductive coil spring 54 is applied to the pressing portion 50, the lower conductive member 52 moves in the pressing direction and contacts the conductive coil spring 55. At this time, the signal patterns 59a, 59b, and 59c are electrically connected via the upper conductive member 51, the lower conductive member 52, and the conductive coil springs 53, 54, and 55, so that the second-stage pressing operation is detected.

Since the biasing force of the conductive coil spring 54 is larger than that of each of the conductive coil springs 53 and 55, this embodiment can realize a relationship similar to that between the moving amount and the load of the release button 3 illustrated in FIG. 6.

Fifth Embodiment

Figure 10A:
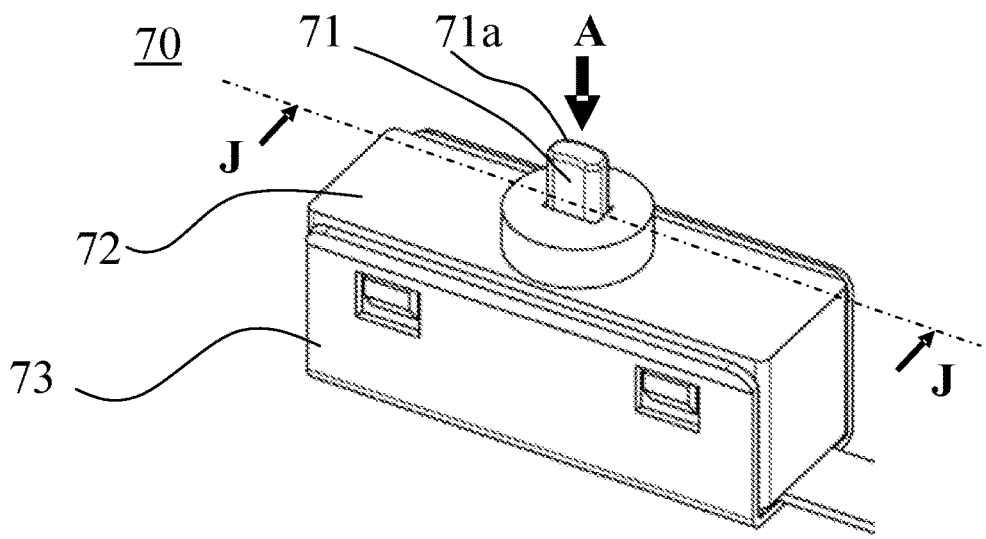
FIG. 10A to 10D explain a release switch according to a fifth embodiment.
Figure 10B:
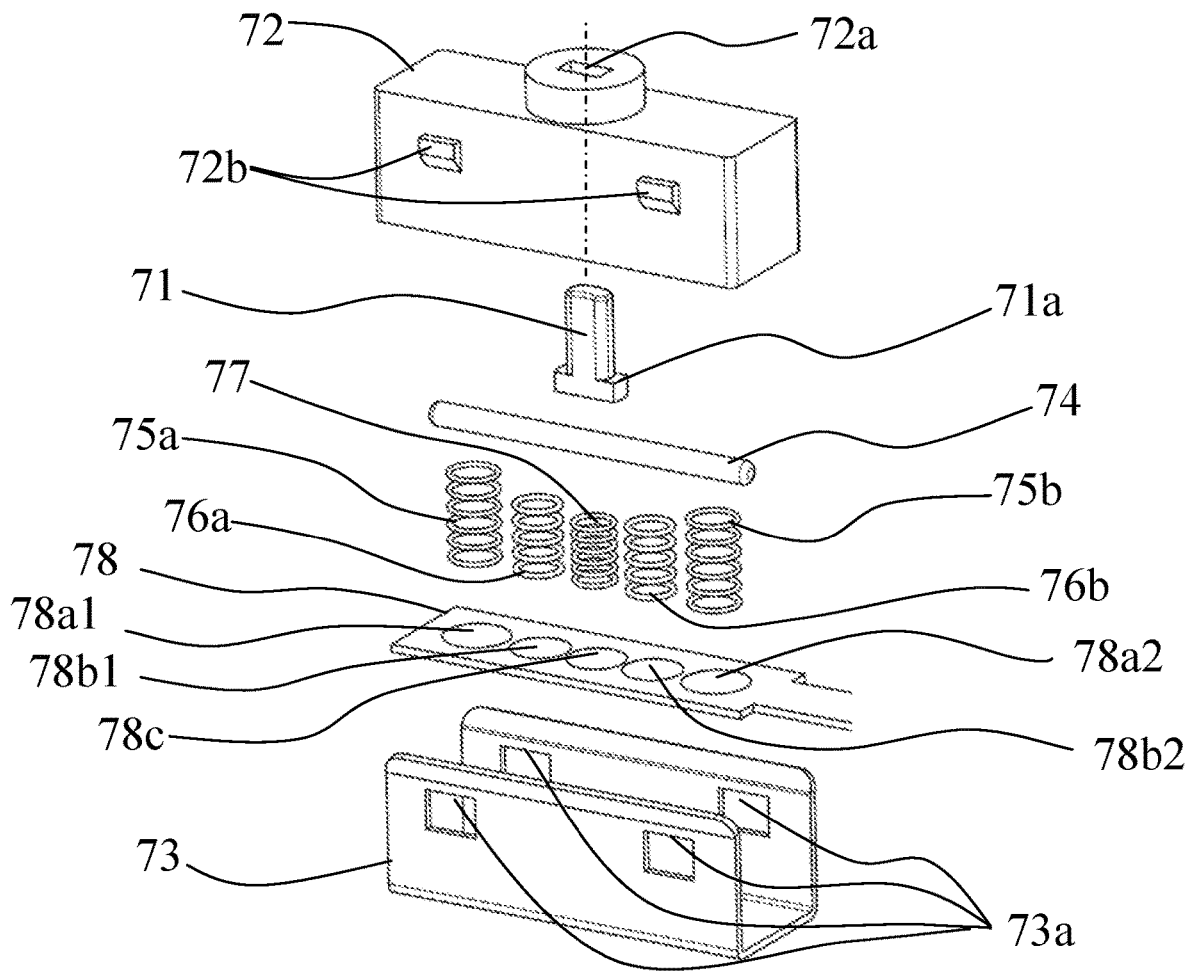
Figure 10C:
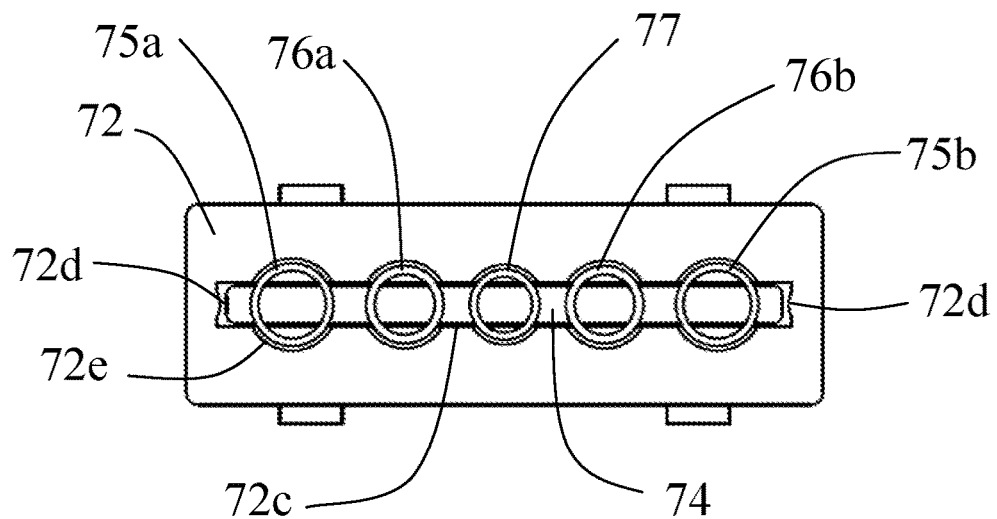
Figure 10D:
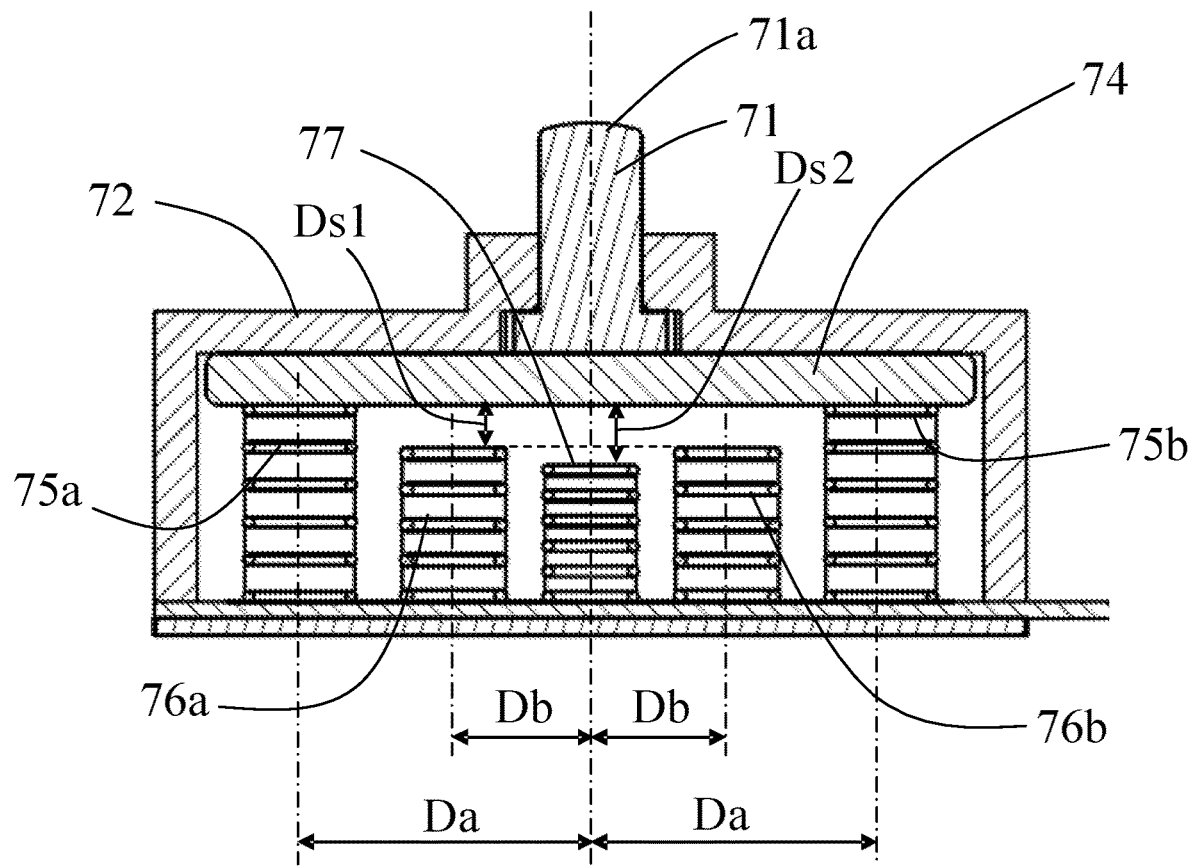

Referring now to FIGS. 10A to 10D, a description will be given of a structure of a release switch 70 according to this embodiment that can provide a low profile. FIGS. 10A to 10D explain the release switch 70 according to this embodiment. FIG. 10A is a perspective view of the release switch 70. FIG. 10B is an exploded perspective view. FIG. 10C illustrates the release switch 70 viewed from the bottom except for the fixing member 73 and the flexible substrate 78. FIG. 10D is a sectional view taken along a line J-J in FIG. 10A.

When a tip portion 71a of a press member 71 is pressed by the release button 3 and the press member 71 moves in the direction of arrow A, the two-stage pressing operation is performed. The base member 72 includes an insertion portion 72a for the press member 71 and guides the movement of the press member 71. A fixing member 73 is formed by bending a sheet metal, provided with engaging portions 73a on both side surfaces, and fixed when engaged with a tab portions 72a of the base member 72.

Conductive coil springs 75a, 75b, 76a, 76b, and 77 are conductive and can be expanded and contracted (are elastically deformable) in the pressing direction of the press member 71 (arrow A). Located on the flexible substrate 78, signal patterns 78a1, 78a2, 78b1, 78b2, and 78c are formed to face the conductive coil springs 75a, 75b, 76a, 76b, and 77, respectively. Where the flexible substrate 78 is incorporated in the release switch 70, each conductive coil spring contacts and is electrically connected to a corresponding signal pattern. The signal patterns 78a1 and 78a2 are connected within the pattern of the flexible substrate 78 and have the same potentials. Similarly, the signal patterns 78b1 and 78b2 have the same potentials. The two points are set to the same potential for more stable connections, but it is not always necessary to set the same potentials and one coil spring may not be conductive as a spring only for generating a desired repulsive force. The cost can be reduced since a surface treatment such as gold plating can be omitted for the coil spring that does not need to be conductive.

A conductive member 74 is made of a linear metal wire, and contacts and electrically connected to the conductive coil springs 75a, 75b, 76a, 76b, and 77. When the release button 3 is pressed, the conductive member 74 moves through the press member 71 and contacts the conductive coil springs 75a, 75b, 76a, 76b, and 77 according to the moving amount.

As illustrated in FIG. 10C, the base member 72 includes a passage groove 72c and a guide portion 72d configured to guide the movement of the conductive member 74, and housing portions 72e for housing the conductive coil springs 75a, 75b, 76a, 76b, and 77, respectively.

FIG. 10D illustrates the initial state of the release switch 70. The conductive member 74 contacts and is electrically connected to the conductive coil springs 75a and 75b near both ends, and is held and forced against an inner wall side of the base member 72 in a direction opposite to the pressing direction. On the other hand, the conductive coil springs 76a and 76b contact the contact surface of the base member 72 at the same heights, are compressed to predetermined lengths, and held with a predetermined first clearance Ds1 from the conductive member 74. The conductive coil spring 77 is also compressed by the base member 72 to a predetermined length, and is held with a second clearance Ds2 longer than the first clearance Ds1 from the conductive member 74.

As the release button 3 is pressed, the release button 3 presses the tip portion 71a of the press member 71 and compresses the conductive coil springs 75a and 75b via the conductive member 74, and the press member 71 and the conductive member 74 move in the pressing direction. When the conductive member 74 contacts the conductive coil springs 76a and 76b, the signal patterns 78a1 and 78a2 are electrically connected to the signal patterns 78b1 and 78b2 via the conductive member 74, and the first-stage pressing operation is detected.

When the release button 3 is further pressed, the conductive member 74 contacts the conductive coil spring 77, and the signal patterns 78a1, 78a2, 78a2, 78b2, and 78c are electrically connected via the conductive member 74, and the second-stage pressing operation is detected.

It is necessary for the release button specification to set the biasing load of the conductive coil spring brought into contact in the first-stage pressing operation to be large to some extent so as to easily maintain the stroke position of the release button 3 when the first-stage pressing operation is detected. Thereby, focusing can be performed in the first-stage pressing operation, and the user is likely to release the shutter at an intended timing.

However, in order to generate a large biasing force, it is necessary to increase the wire diameter of the coil spring. If the high durability performance of the switch is to be maintained, the number of turns of the coil spring cannot be reduced. Hence, there is a limit in reducing the adhesion height of the coil spring determined by the wire diameter and the number of turns, and the height of the switch itself cannot be further reduced.

This embodiment uses two coil springs that are required to have a high biasing force (76a, 76b), halves the biasing force required for a single coil spring, reduces the wire diameter, and makes thinner the switch itself.

This embodiment realizes the cost reduction by forming the conductive member 72 in the simply linear shape. However, it is necessary to horizontally drop the conductive member 72 so as to smoothly press the press member 71 and to maintain the accuracy of the stroke position of the first-stage and second-stage pressing operations. It is thus necessary to make the repulsive forces always act bilaterally symmetrically on the pressing portion of the press member 71. Advantageously, two coil springs that are required to have a high biasing force are equally disposed on the left and right sides with respect to the press member 71.

This embodiment disposes the conductive coil spring 77 just below the press member 71 in the pressing direction, as illustrated in FIG. 10D. The conductive coil springs 76a and 76b are disposed away from the center of the press member 71 by the distance Db, and the conductive coil springs 75a and 75b are disposed outside the center by the distance Da apart from the center of the press member 71. The conductive coil springs 75a and 75b do not have to be strictly disposed just below the press member 77, and may be disposed approximately just below the press member 77, which can be regarded as being just below the press member 77.

The conductive coil springs 75a and 75b to be brought into contact with the conductive member 74 from the initial state may be disposed on the outermost side near both ends of the conductive member 74 as in this embodiment for the stable operation of the conductive member 74. For the stroke accuracy from the first-stage pressing operation to the second-stage pressing operation, the conductive coil springs 76a, 76b, and 77 may be located near the press member 71. Hence, the arrangement according to this embodiment is suitable which disposes the conductive coil spring 77 just below the press member 71, the conductive coil springs 76a and 76b on both sides of it, and the conductive coil springs 75a and 75b outside of it.

This embodiment disposes the pair of conductive coil springs 75a and 75b with the same loads and symmetrically (at equal distances from the press member 71) with respect to the press member 71 as a center, thereby pressing the press member 71 while maintaining the conductive member 74 horizontal. Even if the pair of conductive coil springs 75a and 75b are disposed at different distances from the press member 71, the conductive member 74 can be horizontally operated by properly setting the respective loads of the conductive coil springs 75a and 75b. The same applies to the arrangement of the pair of conductive coil springs 76a and 76b. Even if they are disposed at different distances, the conductive member 74 can be horizontally operated by properly setting the respective loads.

Sixth Embodiment

Figure 11A:
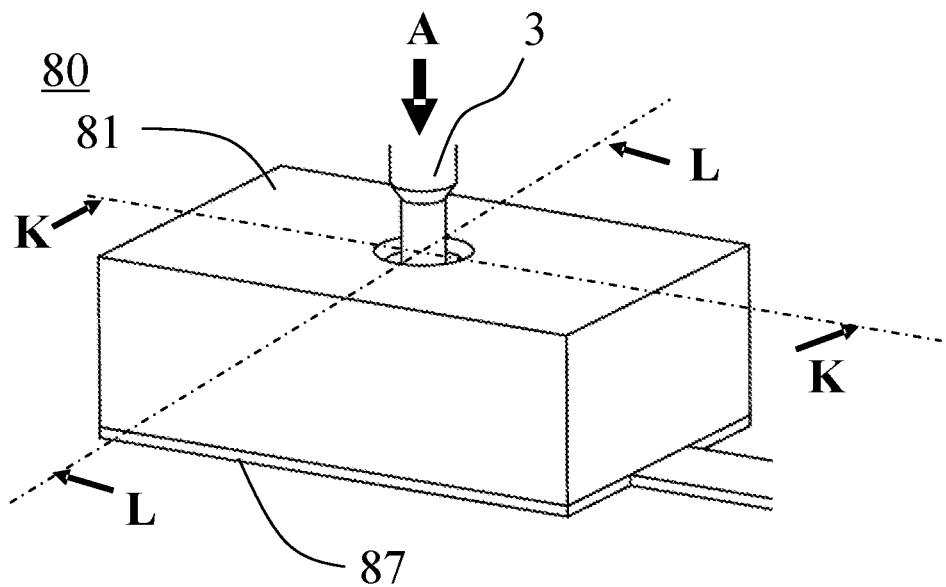
FIGS. 11A to 11D explain a release switch according to a sixth embodiment.
Figure 11B:
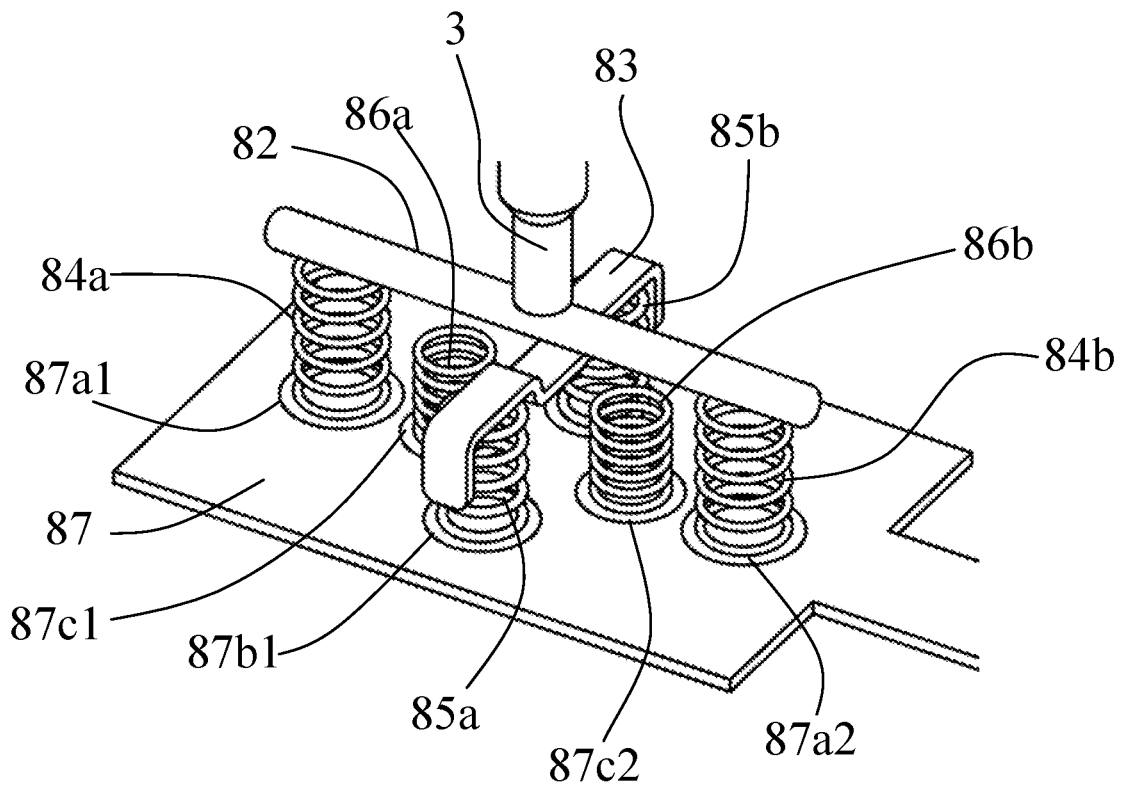
Figure 11C:
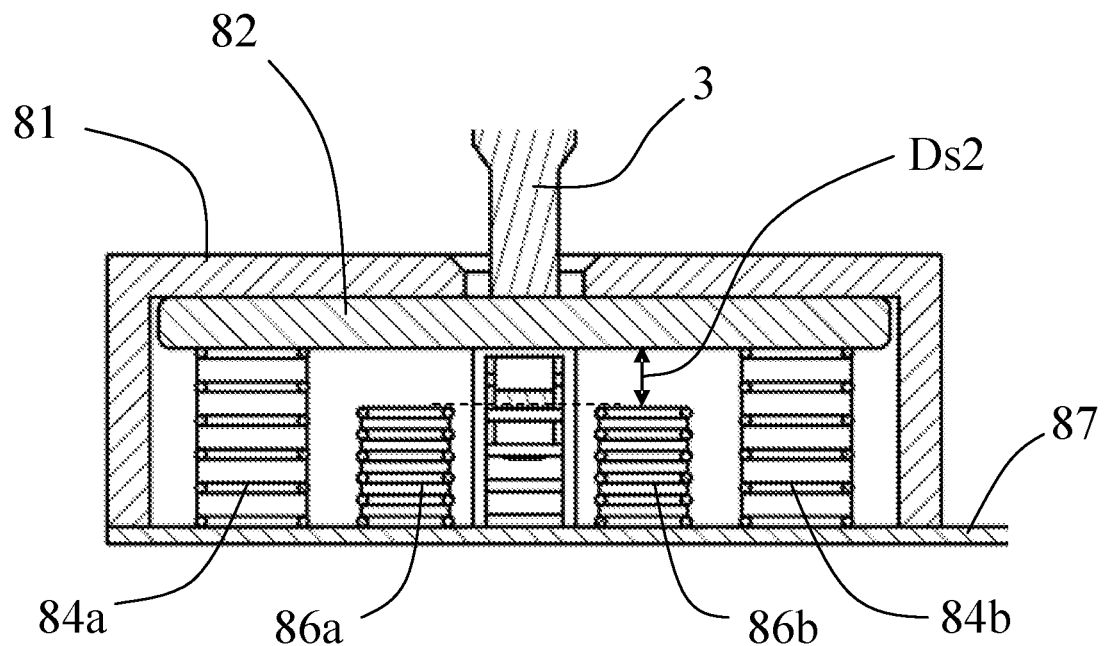
Figure 11D:
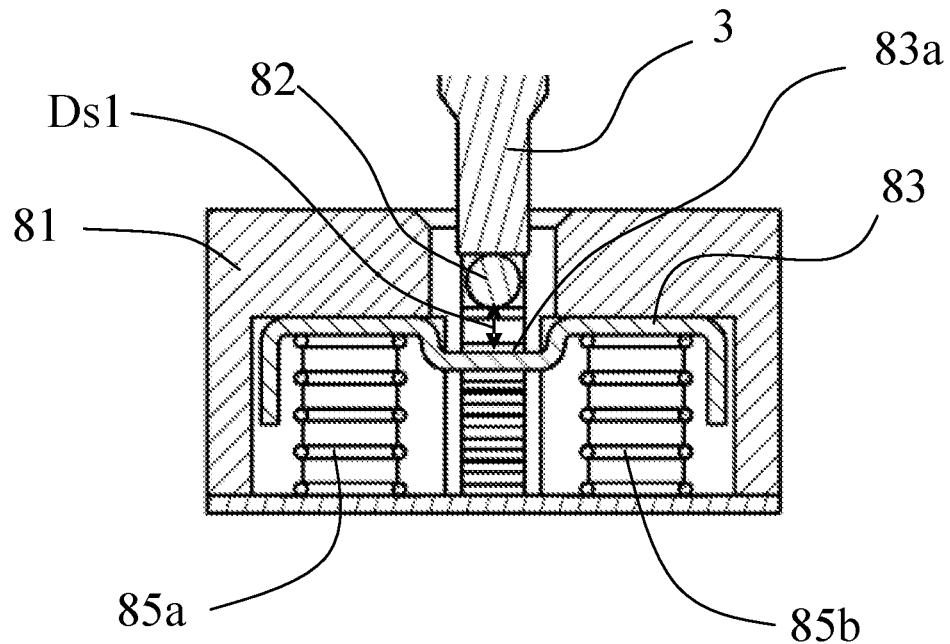

Referring now to FIG. 11A to 11D, a description will be given of a structure of a release switch 80 according to this embodiment that can provide a low profile. FIGS. 11A to 11D explain the release switch 80 according to this embodiment. FIG. 11A is a perspective view of the release switch 80. FIG. 11B is a perspective view of the release switch 80 except for a base member 81. FIG. 11C is a sectional view taken along a line K-K in FIG. 11A, and FIG. 11D is a sectional view taken along a line L-L in FIG. 11A.

Conductive coil springs 84a, 84b, 85a, 85b, 86a, and 86b are conductive and can be elastically deformed (expanded and contracted) in the pressing direction (arrow A). A flexible substrate 87 includes signal patterns 87a1, 87a2, 87b1, 87b2, 87c1, and 87c2 that face the conductive coil springs 84a, 84b, 85a, 85b, 86a, and 86b, respectively. When incorporated in the release switch 80, each conductive coil spring contacts and is electrically connected to the corresponding signal pattern. The signal patterns 87a1 and 87a2 are connected within the pattern of the flexible substrate 87 and have the same potentials. Similarly, the signal patterns 87b1 and 87b2 and the signal patterns 87c1 and 87c2 have the same potentials.

A conductive member 82 is a linear metal wire, and contacts and is electrically connected to the conductive coil springs 84a, 84b, 86a, and 86b. A conductive sheet metal member (conductive bending member) 83 is disposed near the release button 3 and orthogonally to the conductive member 82, and contacts and is electrically connected to the conductive coil springs 85a and 85b. The sheet metal member 83 does not have to be disposed so as to be strictly orthogonal to the conductive member 82, and may be disposed substantially or approximately orthogonally.

FIGS. 11C and 11D illustrate the initial state of the release switch 80. The conductive member 82 contacts and is electrically connected to the conductive coil springs 84*a* and 84*b* near both ends, and is held and forced against the inner wall side of the base member 81 in the direction opposite to the pressing direction.

On the other hand, the conductive coil springs 85*a* and 85*b* are held and forced against the inner wall of the base member 81 through the sheet metal member 83 in a compressed state. The conductive member 82 and the sheet metal member 83 are held with a first clearance Ds1.

The conductive coil springs 86*a* and 86*b* contact the contact surface of the base member 81 at the same heights, and are compressed to predetermined lengths, and are held with a second clearance Ds2 longer than the first clearance Ds1 from the conductive member 82.

The sheet metal member 83 has a concave shape near the intersection of the sheet metal member 83 and the conductive member 82, and a contact position 83*a* of the sheet metal member 83 with the conductive member 82 is made lower than the heights of the conductive coil springs 85*a* and 85*b*, so that the thickness is reduced. Since the two conductive coil springs (86*a*, 86*b*) for detecting the second-stage pressing operation are disposed apart from a crank portion of the sheet metal member 83, the thickness of the structure can be further reduced.

Each of the above embodiments can provide an easy-to-operate, compact, and easy-to-assemble switch and an imaging apparatus having the same.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-010435, filed on Jan. 24, 2019, which is hereby incorporated by reference herein in its entirety.

What is claimed is:

1. A switch comprising:
   a press member movable in a pressing direction when pressed;
   a substrate having a first signal pattern, a second signal pattern, and a third signal pattern;
   a first elastic member that is conductive, disposed between the press member and the substrate, and configured to contact the first signal pattern;
   a second elastic member that is conductive, disposed between the press member and the substrate, and configured to contact the second signal pattern; and
   a third elastic member that is conductive, disposed between the press member and the substrate, and configured to contact the third signal pattern,
   wherein the second elastic member is elastically deformable in the pressing direction,
   wherein when a first pressing operation is performed for the press member so as to move the press member from an initial position in the pressing direction, the first and second signal patterns are electrically connectable via the first and second elastic members, and
   wherein after the first pressing operation, when a second pressing operation is performed for the press member so as to move the press member in a direction opposite to the pressing direction by the first and second elastic members, the first to third signal patterns are electrically connectable via the first to third elastic members.

2. The switch according to claim 1, wherein the first and third elastic members are deformable in the pressing direction.

3. The switch according to claim 1, wherein the first to third elastic members are disposed in a compressed state when the press member is located at the initial position.

4. The switch according to claim 1, wherein the second elastic member has a biasing force in the opposite direction, which is larger than that of each of the first and third elastic members when the press member is located at the initial position.

5. The switch according to claim 1, further comprising a conductive member configured to contact the first elastic member,
   wherein in the first pressing operation, the press member moves against a biasing force in the opposite direction by the first elastic member after contacting the conductive member,
   wherein when the first pressing operation is performed, the conductive member contacts the second elastic member, and the first and second signal patterns are electrically connectable via the conductive member and the first and second elastic members, and
   wherein when the second pressing operation is performed, the conductive member contacts the third elastic member, and the first to third signal patterns are electrically connectable via the conductive member and the first to third elastic members.

6. The switch according to claim 5, wherein each of the first to third elastic members includes a coil spring.

7. The switch according to claim 6, further comprising a holder configured to elastically deformably hold the first to third elastic members in the pressing direction with the substrate.

8. The switch according to claim 7, wherein the holder is a housing configured to house the first to third elastic members.

9. The switch according to claim 7, wherein the holder includes a passage groove in which the conductive member is movable, and a first contact portion and a second contact portion configured to contact the second and third elastic members, respectively, when the press member is located at the initial position, and
   wherein the first and second contact portions are provided so as to sandwich the passage groove, respectively.

10. The switch according to claim 6, wherein the first to third elastic members are concentrically arranged around a pressing center of the press member.

11. The switch according to claim 7, wherein the conductive member includes metal wire having an L or U shape and is movably attached to the holder.

12. The switch according to claim 5, wherein the conductive member includes:
    a first conductive member configured to contact the first elastic member; and
    a second conductive member configured to contact the second elastic member, wherein the second conductive member contacts the first conductive member after the first pressing operation, and contacts the third elastic member after the second pressing operation.

13. The switch according to claim 1, wherein in the first pressing operation, the press member moves against the biasing force in the opposite direction by the first elastic member after contacting the first elastic member,
    wherein after the first pressing operation is performed, the first elastic member contacts the second elastic member, and the first and second signal patterns are electrically connectable via the first and second elastic members, and wherein after the second pressing operation is performed, the first elastic member contacts the third elastic member, and the first to third signal patterns are electrically connectable via the first to third elastic members.

14. The switch according to claim 13, wherein each of the second and third elastic members includes a coil spring.

15. The switch according to claim 14, wherein the second and third elastic members are arranged concentrically around a pressing center of the press member.

16. The switch according to claim 13, wherein the first elastic member includes:
- a contact portion configured to contact the second and third elastic members;
- an elastic member provided on both sides of the contact member and elastically deformable in the pressing direction; and
- a connector connected to the first signal pattern.

17. The switch according to claim 1, wherein the first elastic member includes a pair of elastic members, and the second elastic member includes a pair of elastic members.

18. The switch according to claim 17, wherein the first and second elastic members are equally distant from the press member.

19. The switch according to claim 17, wherein the third elastic member is disposed just below the press member in the pressing direction.

20. The switch according to claim 17, wherein the conductive member has a linear shape.

21. The switch according to claim 17, further comprising a conductive bending member disposed with a predetermined clearance from the conductive member in the pressing direction and orthogonal to the conductive member, and
wherein the first pressing operation brings the conductive member into contact with a bending contact portion of the conductive bending member and electrically connects the conductive member, and the bending contact portion is located at a position lower than an initial position of the second elastic member.

22. An imaging apparatus comprising:
a switch;
a first detector configured to detect the first pressing operation by detecting that the first and second signal patterns are electrically connected; and
a second detector configured to detect the second pressing operation by detecting that the first to third signal patterns are electrically connected,
wherein the switch includes:
a press member movable in a pressing direction when pressed;
a substrate having a first signal pattern, a second signal pattern, and a third signal pattern;
a first elastic member that is conductive, disposed between the press member and the substrate, and configured to contact the first signal pattern;
a second elastic member that is conductive, disposed between the press member and the substrate, and configured to contact the second signal pattern; and
a third elastic member that is conductive, disposed between the press member and the substrate, and configured to contact the third signal pattern;
wherein the second elastic member is elastically deformable in the pressing direction,
wherein when a first pressing operation is performed for the press member so as to move the press member from an initial position in the pressing direction, the first and second signal patterns are electrically connectable to each other via the first and second elastic members, and
wherein after the first pressing operation, when a second pressing operation is performed for the press member so as to move the press member in a direction opposite to the pressing direction by the first and second elastic members, the first to third signal patterns are electrically connectable to one another via the first to third elastic members.

* * * * *